United States Patent Office 3,300,501
Patented Jan. 24, 1967

3,300,501
6-AZASTEROIDS
Joseph H. Burckhalter, Ann Arbor, Mich., assignor to
The Regents of the University of Michigan, Ann Arbor,
Mich., a corporation of Michigan
No Drawing. Filed Apr. 9, 1964, Ser. No. 358,618
5 Claims. (Cl. 260—289)

This invention relates to certain novel azasteroids and is more particularly concerned with those of the formula:

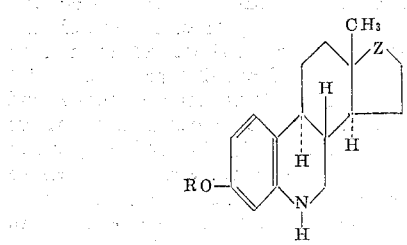

wherein R is selected from the group consisting of hydrogen and methyl and Z is selected from the group consisting of the β-hydroxymethylene radical

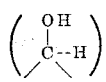

and the carbonyl radical

It further relates to processes for the preparation of the compounds of the above composite formula and to intermediates therefor.

The novel compounds of this invention and processes therefor are illustratively represented by the following sequence of formulae.

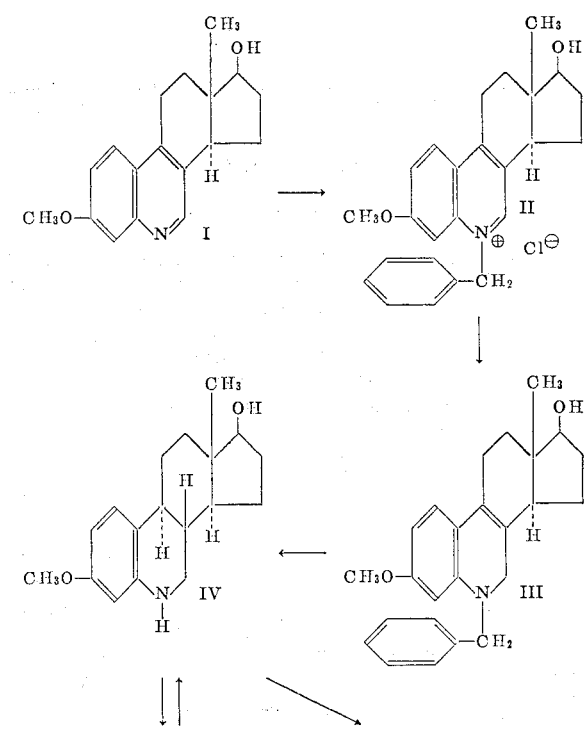

The compounds of Formulae IV to IX of the flow-sheet shown above lower blood cholesterol levels in mammals, birds, rats, and animals and can therefore be used in the treatment of atherosclerosis. These compounds also have estrogenic activity and have in addition the advantageous property of not producing concomitant feminization.

The compounds of Formulae IV to IX potentiate the emulsification of fats.

The compounds represented by Formulae IV to IX can be prepared and administered to mammals, birds, rats, and animals in a wide variety of oral and parenteral dosage forms, singly or in a mixture with other coacting compounds. They can be associated with a carrier which can be a solid material or liquid, in which the compound is dissolved, dispersed or suspended. The solid compositions can take the form of tablets, powders, capsules or the like, preferably in unit forms for precise dosage.

The novel 6-azasteroids of this invention represented by the composite formula set forth on page 1, above, are prepared by the routes shown in the flow-sheet, above, by the methods and reactions disclosed below. These novel products and intermediates represent racemic (DL) mixtures which can be separated by methods known in the art, e.g., Bachman, J. Am. Chem. Soc. 61, 974 (1939) and 62, 824 (1940).

(1) The first step of the process involves the conversion of the starting compound 6-aza-17-dihydroequilenin 3-methyl ether (I) [prepared as on pages 14A and 15A of "Abstracts of Papers Presented at the 143rd Meeting of the American Chemical Society, Cincinnati, Ohio, January 13 through 18, 1963"] to its corresponding N- benzyl halide (II) by conventional methods, e.g., refluxing the compound of Formula I with benzyl chloride in an alkanol such as absolute alcohol.

(2) In the next step of the process the 6,7-double bond of the compound of Formula II is reduced, e.g., with sodium borohydride in 95% alcohol, to give a good yield of 6-aza-8(9)-dehydro-estradiol 3-methyl ether (III).

(3) Treating a solution of the thus-produced compound (III) in aniline and liquid ammonia to which potassium metal is added, yields 6-azaestradiol 3-methyl ether (IV).

(4) The thus-produced compound (IV) is readily converted to its corresponding 3β-hydroxy derivative (VI) by conventional methods, e.g., by heating with potassium hydroxide in absolute ethanol in a sealed tube.

(5) The compound of Formula IV is oxidized, e.g., with sodium dichromate in glacial acetic in accordance with methods known in the art, to yield 6-azaestrone 3-methyl ether (V).

(6) The thus-produced 17-ketosteroid compound of Formula V can readily be converted by known procedures, e.g., by reduction with sodium borohydride in ethanol, to yield 6-azaestradiol 3-methyl ether (IV).

(7) 6-azaestrone 3-methyl ether (V) is demethylated at the 3-position in the same manner as in (4), above, to give 6-azaestrone (VII).

The compound of the Formula IV can be prepared by an alternate procedure, as follows:

(8) N-tosyl-6-aza-8,14-bisdehydroestrone (VIII) is prepared in the manner disclosed in Rec. Trav. Chim. 82, 898 (1963) by means of the general method of U.S.S.R. Patent 77865/31–16, issued May 18, 1962; the thus-produced compound is hydrogenated in a solvent such as dioxane or methanol in the presence of palladium catalyst on charcoal, by the method disclosed in Chem. and Ind. 1022 (1960), to give N-tosyl-6-aza-8(9)-dehydroestrone methyl ether (IX).

(9) Reduction of the compound of Formula IX is carried out in the same manner as in (3), above, to yield 6-azaestrone 3-methyl ether (V), which can subsequently be reduced in the same manner as in (6), above, to give 6-azaestradiol 3-methyl ether (IV).

All of the compounds embraced by Formulae I through IX are isolated from their reaction mixtures by conventional means, for example, when a water-miscible solvent is used, by pouring the reaction mixture into water, and separating the resulting precipitate by filtration. Additional purification of the product can be accomplished by conventional methods, for example, by elution chromatography from an adsorbent column with a suitable solvent such as acetone, methanol, dilute methanol, ethanol, ether, methylene chloride, and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

EXAMPLE 1

*N-benzyl chloride of 6-aza-17-dihydroequilenin 3-methyl ether (II)*

A mixture of 6 g. of 6-aza-17-dihydroequilenin 3-methyl ether (I) (prepared as in U.S. patent application Serial No. 336,886, filed January 10, 1964) and 3.2 g. of benzyl chloride was dissolved in 30 ml. of absolute alcohol and the solution heated for a period of about 15 hours at reflux temperature. The reaction mixture was concentrated to a volume of about 15 ml. and cooled to precipitate 7.5 g. (86% yield) of the N-benzyl chloride of 6-aza-17-dihydroequilenin 3-methyl ether (II).

EXAMPLE 2

*6-aza-6-benzyl-8(9)-dehydroestradiol 3-methyl ether (III)*

To a solution of 7.5 g. of the N-benzyl chloride of 6-aza-17-dihydroequilenin 3-methyl ether (II) in 100 ml. of 95% alcohol maintained at from about 0° C. to about 5° C., 2.7 g. of sodium borohydride was added in small portions. The resulting mixture was maintained at room temperature (about 25° C.) for three hours then was poured into 500 ml. of water to give a yellow crystalline precipitate which was collected and washed with water to give 6.3 g. of crude product. Recrystallization from methanol yielded 4.2 g. (61% yield) of 6-aza-6-benzyl-8(9)-dehydroestradiol 3-methyl ether (III) melting at 76 to 78.5° C.

EXAMPLE 3

*6-azaestradiol 3-methyl ether (IV)*

To a solution of 4.2 g. of 6-aza-6-benzyl-8(9)-dehydroestradiol 3-methyl ether (III), 5 g. of aniline and 250 ml. of liquid ammonia, potassium metal was added in small pieces until the blue color did not disappear (about 5.1 g.) An additional gram of potassium was added, and the mixture allowed to stand for about 2 hours before neutralization with ammonium chloride, following which the ammonia was removed by evaporation. The residue was treated with water to dissolve inorganic material, then extracted with ether, the extract dried, the ether removed by evaporation and the aniline distilled off under reduced pressure to give a solid crystalline product. Recrystallization from alcohol gave 1.8 g. (56% yield) of colorless, crystalline 6-azaestradiol 3-methyl ether (IV), melting at 180 to 181° C. A sample recrystallized for analysis melted at 183 to 184° C.

*Analysis.*—Calcd. for $C_{18}H_{25}NO_2$: C, 75.22; H, 8.77; N, 4.87. Found: C, 75.39; H, 8.82; N, 4.79.

EXAMPLE 4

*6-azaestradiol (VI)*

A mixture of 100 mg. of 6-azaestradiol 3-methyl ether (IV), 200 mg. of powdered potassium hydroxide and 1 ml. of absolute ethanol is heated in a sealed tube at 225° C. for a period of about 24 hours. The mixture is acidified with dilute hydrochloric acid to pH 7 and the resulting crystalline solid collected, washed with water, dried and recrystallized from alcohol to yield 6-azaestradiol (VI), melting at 175 to 185° C.

EXAMPLE 5

*6-azaestrone (VII)*

Following the procedure of Example 4 but substituting 6-azaestrone 3-methyl ether (V) as starting material yields 6-azaestrone (VII).

EXAMPLE 6

*6-azaestrone 3-methyl ether (V)*

To a stirred solution of 1 g. of 6-azaestradiol 3-methyl ether (IV) in 1 ml. of glacial acetic acid cooled in an ice bath, 0.35 g. of sodium dichromate dihydrate in 4 ml. of glacial acetic acid is added dropwise. The mixture is allowed to stand at room temperature for about 24 hours, then poured into 100 ml. of water and neutralized with dilute ammonium hydroxide solution to obtain 6-azaestrone 3-methyl ether (V).

EXAMPLE 7

*6-azaestradiol 3-methyl ether (IV)*

To a suspension of 2 g. of 6-azaestrone 3-methyl ether (V) in 10 ml. of 95% ethanol, 0.4 g. of sodium borohydride is added is small portions at 0 to 5° C. The mixture is allowed to stand at room temperature for about 4 hours. Excess of sodium borohydride is decomposed by addition of acetic acid. Addition of water and collection of the crystals yielded 6-azaestradiol 3-methyl ether (IV).

EXAMPLE 8

*N-tosyl-6-aza-8(9)-dihydroestrone 3-methyl ether (IX)*

A methanol solution of 1.5 g. of N-tosyl-6-aza-8,14-bis-dehydroestrone 3-methyl ether (VIII) [prepared in the manner disclosed in Rec. Trav. Chim. 82, 898 (1963) by means of the general method of U.S.S.R. Patent 778652/31-16] is hydrogenated over 1 g. of 10% palladium on charcoal at room temperature and at atmospheric pressure. Catalyst and charcoal are removed by filtration and the filtrate evaporated to obtain the crude product. Recrystallization from methanol gives pure N-tosyl-6-aza-8(9)-dehydroestrone 3-methyl ether (IX).

EXAMPLE 9

*6-azaestrone 3-methyl ether (V)*

To a solution of 5 g. of N-tosyl-6-aza-8(9)-dehydroestrone 3-methyl ether (IX), 6 g. of aniline and 300 ml. of liquid ammonia 6 g. of potassium metal is added in small pieces until the blue color remains. An additional gram of potassium metal is added, and the mixture allowed to stand for about 2 hours before neutralization with ammonium chloride, following which the ammonia is removed by evaporation. The residue is treated with water to dissolve inorganic materials, then extracted with ether, the extract dried, the ether removed by evaporation and the aniline distilled off under reduced pressure to give a solid crystalline product. Recrystallization from alcohol gives pure, crystalline 6-azaestrone 3-methyl ether (V).

I claim:

1. 6-azaestradiol of the formula

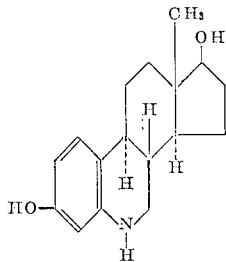

2. 6-azaestradiol 3-methyl ether of the formula

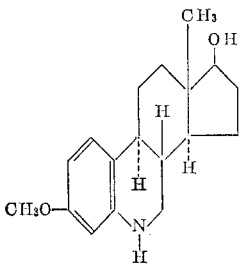

3. 6-azaestrone of the formula

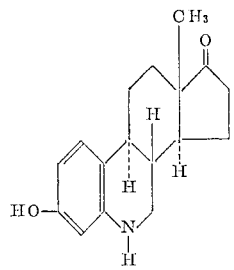

4. 6-azaestrone 3-methyl ether of the formula

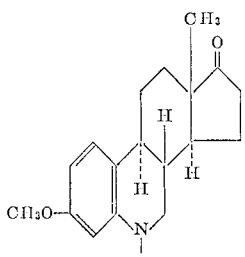

5. N-tosyl-6-aza-8(9)-dehydroestrone 3-methyl ether of the formula

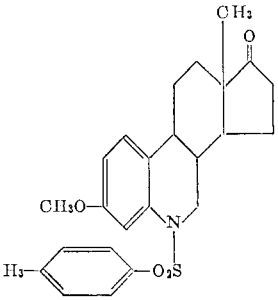

References Cited by the Examiner

Fieser et al.: "Natural Products," Reinhold, 1949, page 322 relied on.

ALEX MAZEL, *Primary Examiner.*

HENRY R. JILES, *Examiner.*

DONALD G. DAUS, *Assistant Examiner.*

UNITED STATES PATENT OFFICE
CERTIFICATE OF CORRECTION

Patent No. 3,300,501                                    January 24, 1967

Joseph H. Burckhalter

It is hereby certified that error appears in the above numbered patent requiring correction and that the said Letters Patent should read as corrected below.

Column 6, lines 19 to 30, the formula should appear as shown below instead of as in the patent:

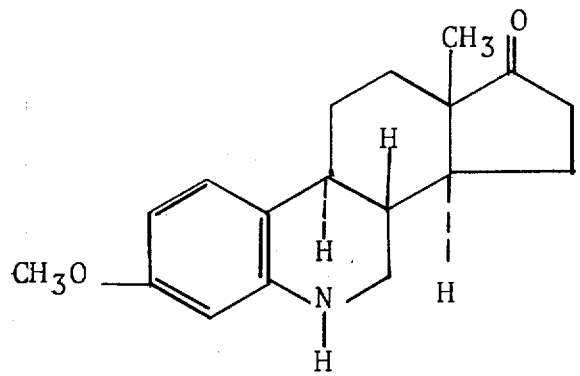

column 6, lines 35 to 45, the formula should appear as shown below instead of as in the patent:

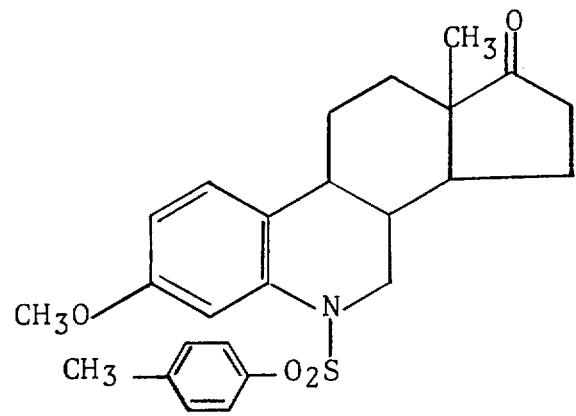

Signed and sealed this 28th day of November 1967.

(SEAL)
Attest:

EDWARD M. FLETCHER, JR.
Attesting Officer

EDWARD J. BRENNER
Commissioner of Patents